March 7, 1961 W. G. E. SMITH 2,973,930
FISHING ROD HOLDER
Filed Sept. 14, 1959 2 Sheets-Sheet 1
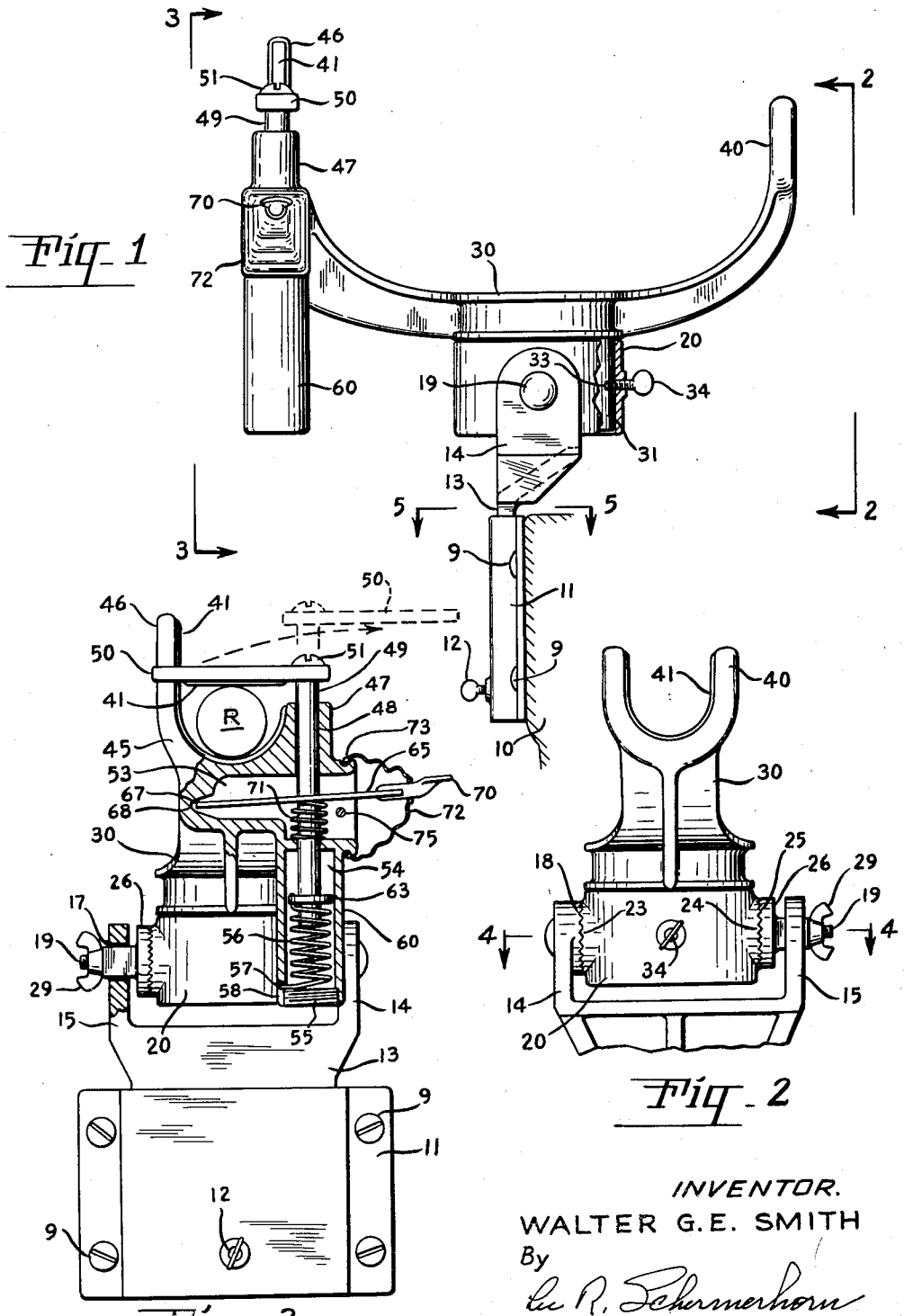
INVENTOR.
WALTER G. E. SMITH
By
Lee R. Schermerhorn
Attorney March 7, 1961 W. G. E. SMITH 2,973,930
FISHING ROD HOLDER Filed Sept. 14, 1959 2 Sheets-Sheet 2

INVENTOR.
WALTER G. E. SMITH
By
Lu R. Schermerhorn
Attorney

United States Patent Office 2,973,930
Patented Mar. 7, 1961

2,973,930
FISHING ROD HOLDER

Walter G. E. Smith, Longbranch, Wash., assignor to The United States National Bank of Portland, Oregon, trustee Filed Sept. 14, 1959, Ser. No. 839,859

9 Claims. (Cl. 248—40)

This invention relates to a holder for a fishing rod while fishing, and has particular reference to an improved clamp and latch device which will clamp the rod securely in the holder but which may be released instantly for removing the rod to play and land the fish.

Many fishing rod holders have heretofore been devised, generally for light poles or rods used for still fishing for small fish in a lake or quiet stream. Prior holders have not proved satisfactory or practical in fishing for the larger deep water species in the ocean, bays or large rivers. There exists the problem of holding the rod securely so that it will not be pulled out of the holder when the fish strikes and, at the same time, providing convenient release means so that the rod may be removed quickly after a strike before the fish can disengage himself from the hook. Prior devices, seeking a solution to this problem, have for the most part been too complicated and expensive to manufacture and have not been successful in always providing the instant release which is necessary to enable the operator to keep the fish hooked, regardless of the direction in which the fish may be pulling the line.

The general object of the present invention is, therefore, to provide an improved fishing rod holder which successfully overcomes the disadvantages and shortcomings of the prior devices mentioned above.

Another object is to provide a fishing rod holder suitable for the heavy rods and lines used in obtaining large and fighting varieties of fish.

Another object is to provide a holder which clamps the rod securely but from which the rod can be released instantly by the operator, regardless of the direction in which the fish may be pulling the line.

Another object is to provide an improved clamping and latching mechanism which will automatically adjust itself to the thickness of the fishing rod handle each time the handle is clamped.

Still another object is to provide a holder of the type described which is rugged and durable in service and yet relatively simple and inexpensive to manufacture.

The present device comprises a cradle having front and rear forks or saddles to rest the rod at the desired angle and inclination. The front fork is open at the top while the rear fork is equipped with a novel clamp arm which automatically accommodates itself to the varying thickness of fishing rod handles. When released by a simple trigger mechanism, the clamping arm rises vertically and, at the same time, swings clear of the handle so that the latter may be removed instantly from the holder, regardless of the direction in which the fish may be pulling.

The foregoing and other objects and advantages will become apparent and the invention will be better understood with reference to the following description of a preferred embodiment of the invention illustrated in the accompanying drawings. It is to be understood, however, that various changes may be made in the form and arrangement of parts and all such modifications within the scope of the appended claims are included in the invention.

In the drawings:

Figure 1 is a side elevation view of a fishing rod holder embodying the principles of the invention;

Figure 2 is a fragmentary end elevation view of the front or outer end of the holder taken on the line 2—2 of Figure 1;

Figure 3 is an elevation view of the rear or inner end of the holder, taken on the line 3—3 in Figure 1, showing the clamp and latch mechanism in section;

Figure 4:
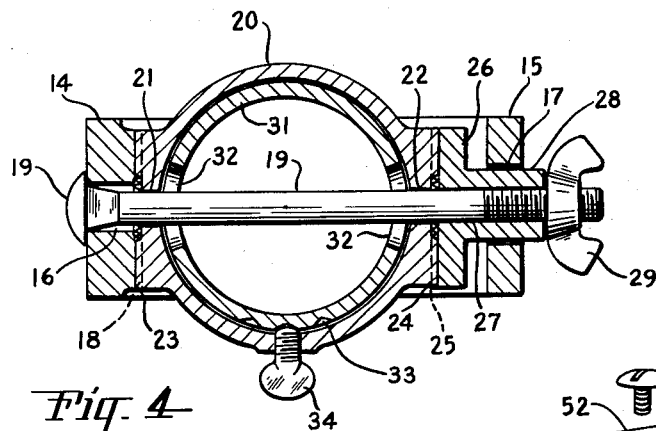
Figure 4 is a sectional view taken on the line 4—4 of Figure 2.
Figure 5:
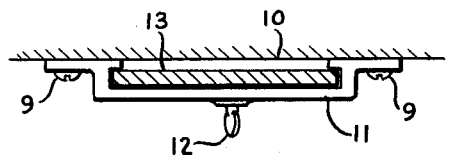
Figure 5 is a sectional view taken on the line 5—5 of Figure 1.

Mounted on the gunwale 10 of a boat, or other suitable support, and secured thereto by screws 9, is a flat socket 11 equipped with a retainer screw 12 as shown in Figure 1. Removably mounted in socket 11 is a flat plate post 13 having a pair of upstanding clevis arms 14 and 15 on its upper end. Clevis arms 14 and 15 are provided with square holes 16 and 17, as shown in Figure 4, and the inside surface of arm 14 is equipped with radial teeth 18 around the hole 16 as shown in Figure 2. Plate 13 is apertured to receive screw 12.

A cylindrical bolt 19 having a squared shank portion at its head end extends through the holes 16 and 17 for supporting a cylindrical socket member 20. Bolt 19 passes through round holes 21 and 22 in opposite sides of socket member 20. One side of the socket member 20 is equipped with radial teeth 23 around the hole 21 to engage the teeth 18, and the other side is equipped with radial teeth 24 around the hole 22 to engage similar teeth 25 on a clamping member 26. Clamp member 26 is equipped with a smooth round hole 27 to receive the bolt 19 axially through a square projection 28 which fits the square hole 17. When the parts are clamped together by nut 29, the interengaging teeth prevent rotation of socket member 20 on the bolt. When nut 29 is loosened, clamp member 26 and socket member 20 may be shifted on the bolt to disengage both sets of teeth, whereupon the socket member may be tilted to the desired angle on the bolt. As seen in Figures 2 and 4, the spacing of clevis arms 14 and 15 permits clamp member 26 to be drawn away from the socket member.

The cylindrical base 31 of a cradle 30 is mounted for limited rotation in socket member 20. Base 31 is provided with circumferential slots 32 receiving the bolt 19. A plurality of circumferentially spaced depressions 33 are provided in the outer surface of base member 31 for engagement by a clamping screw 34 in the socket member 20. Thus, the cradle 30 will swing right and left in socket member 20 through a small horizontal angle and will tilt through a considerable vertical angle on the bolt 19 to elevate the tip of the rod as may be desired, both movements being clamped or locked after the cradle has been adjusted in the desired position.

The cradle 30 comprises an arm extending forwardly and rearwardly from its cylindrical base portion 31. The front end of the cradle arm is equipped with an upstanding fork support 40 forming a rod saddle which is preferably equipped with a cushion lining 41 that will not scratch or mar the fishing rod. The rear end of the cradle arm is provided with a semicircular saddle 45 having on one side thereof an upstanding rigid post 46. This saddle and post are similarly equipped with a resilient lining or padding 41. On the opposite side of the saddle 45 is an upstanding boss 47 having a vertical bore 48 for a cylindrical shaft 49. The upper end of shaft 49 carries a horizontal clamp arm 50, the under side of which is also padded with the lining material 41. Arm 50 is secured to shaft 49 by a screw 51 and is made rigid with the shaft by means of knurled striations or the like 52 which prevent the arm from turning on the shaft.

Shaft 49 extends through a chamber 53 in the cradle, is journaled in the bottom wall of this chamber and extends down into a vertical cylindrical chamber 54. The bottom of chamber 54 is closed by a threaded plug 55 which forms a bottom seat for a combined compression and torsion spring 56. The lower end 57 of the spring extends into a recess 58 in a cylindrical housing extension 60 which forms the chamber 54. The upper end 61 of spring 56 projects into an opening 62 in a collar 63 which is rigid on the shaft 49.

Figure 6:
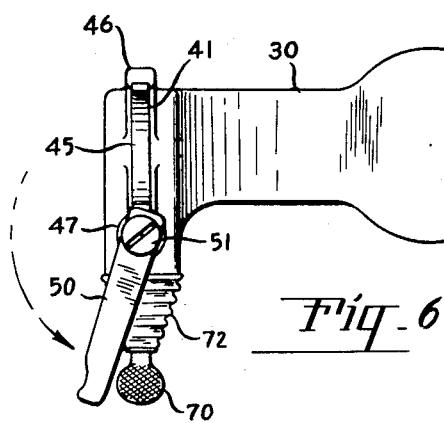
Figure 6 is a fragmentary top plan view of the holder.
Figure 7:
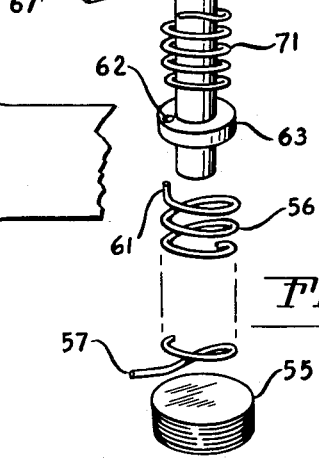
Figure 7 is an exploded view of the clamp and latch mechanism.

The spring and shaft just described are assembled with the spring under compression and in a rotative position to hold arm 50 in the position shown in broken lines in Figure 3 which is the same position shown in full lines in Figure 6. The upward movement of the shaft and arm under the force of spring 56 is limited by engagement of collar 63 with the upper end wall of chamber 54. The rotational movement of arm 50 to the clamped position shown in full lines in Figure 3 is slightly less than 180°. A stop may be provided to limit the counterclockwise rotation in Figure 6, if desired.

Shaft 49 is latched in its full line position in Figure 3 by a latch bar 65 having a hole 66 which fits the shaft loosely. Latch bar 65 has an inner end 67 fulcrumed in a depression 68 in the inner end wall of chamber 53 and an outer end equipped with a thumb piece 70. A spring 71 is compressed between the bottom wall of chamber 53 and the under side of latch bar 65 to hold the latch bar normally in a raised inclined position with its hole 66 binding the shaft 49, as shown in Figure 3. The open outer end of chamber 53 is closed by a flexible boot 72 having a small opening in one end fitting snugly around the shank of finger piece 70 and having a large opening in its other end secured by a snap ring or the like 73 in a circular groove about the open end of chamebr 53. A stop pin 75 limits the downward movement of latch bar 65 in its horizontal position wherein the hole 66 is loose on shaft 49.

In using the holder, a fishing rod is laid in the saddles of the cradle with the tip of the rod projecting outboard to the right in Figure 1. Clamp arm 50 is then swung from its released position shown in Figure 6 in a clockwise direction until it engages the post 46, thereby twisting the spring 56. It is then pressed downward to clamp the rod R in the saddle 45, as shown in Figure 3, compressing spring 56. In practice, the clamp arm is depressed while it is being rotated, which tends to release the binding action of latch bar 65 on shaft 49. When clamp arm 50 has been moved to rod clamping position, and the operator's hand removed, spring 71 holds the latch bar 65 inclined upwardly to bind the shaft 49 securely by frictional engagement with the tilted cylindrical wall of the hole 66 so that the shaft can neither rise nor turn.

It will be apparent that as shaft 49 tries to rise, either by action of spring 56 or by the combined lifting effort of this spring and upward leverage exerted by the fishing rod, latch bar 65 will bind the shaft more firmly to prevent either axial or rotative movements since the inner end 67 of the latch bar is restrained by depression 68 against both vertical movement and rotational movement with the shaft. It will further be apparent that such clamping action is independent of the thickness of the handle of rod R since the shaft will bind in the hole of the latch bar the same in either elevated or depressed position of the shaft. Thus, the clamp arm is automatically adjustable to the thickness of the handle portion of the rod which is engaged thereby, without requiring any conscious act by the operator to make such adjustment.

When the rod is to be removed from the holder, it is necessary only to depress the finger piece 70 until the latch bar 65 engages stop 75 in horizontal position. Actually, only a slight downward movement of the latch bar is necessary to release the shaft 49, the principal purpose of stop 75 being to prevent the latch bar from being depressed too far and again binding the shaft in a lower inclined position of the latch bar which would be undesirable.

When the finger piece 70 is depressed, spring 56 raises shaft 49 and turns it to release position, the release action being so rapid that pressure of the rod handle against the clamp arm 50 does not interfere with the rotary movement of the clamp arm. Even when the rod handle is bearing upwardly against the clamp arm 50 at the moment of release, the shaft 49 and arm 50 rise faster than the rod handle can rise and rotate simultaneously to the Figure 6 position so that the saddle 45 is instantly open for removal of the rod. This instantaneous release action is the same regardless of the direction in which a fish may be pulling the tip of the rod.

The holder is conveniently removed from the boat or other support by merely loosening retainer screw 12 and withdrawing plate 13 from the supporting socket 11. The entire latch mechanism is substantially sealed against the entrance of moisture and dirt when the holder is in use as well as when it is not in use whereby the problem of dirt and corrosion in the moving parts is thereby reduced to a minimum.

Having now described my invention and in what manner the same may be used, what I claim as new and desire to protect by Letters Patent is:

1. A fishing rod holder comprising a vertical flat socket member, a flat plate post removably supported in said socket, a pair of upstanding clevis arms on opposite sides of said plate, a horizontal bolt extending through said clevis arms, a cylindrical socket member pivotally mounted on said bolt between said clevis arms with said bolt extending diametrically through said cylindrical socket, a cradle having a cylindrical base portion rotatably mounted in said cylindrical socket member, a front fork on said cradle for supporting a rod, a rear saddle on said cradle for supporting a rod, and a clamp arm arranged to clamp the rod in said rear saddle, said bolt providing a pivotal support for tilting movement of said cradle in a vertical plane and said cylindrical socket providing a pivotal support for lateral swinging movement of said cradle.

2. A fishing rod holder comprising a support having a pair of spaced clevis arms, a bolt extending through said arms, a socket member pivotally mounted on said bolt, interengaging teeth on one side of said socket member and one of said arms, a clamp member on said bolt on the opposite side of said socket member having a polygonal extension non-rotatably supported in the other arm, a nut on said bolt engageable with said clamp member to clamp said interengaging teeth together, and a cradle for a fishing rod rotatably mounted in said socket member.

3. A fishing rod holder comprising a support having a pair of spaced clevis arms, a bolt extending through said arms, a socket member pivotally mounted on said bolt, interengaging teeth on one side of said socket member and one of said arms, a clamp member on said bolt on the opposite side of said socket member having a polygonal extension non-rotatably supported in the other arm, interengaging teeth on said clamp member and said opposite side of said socket member, a nut on said bolt engageable with said clamp member to clamp said interengaging teeth together, a cradle for a fishing rod having a cylindrical base portion rotatably mounted in said socket member, said base portion having circumferential slots receiving said bolt, and a clamp screw in said socket member engageable with said base portion.

4. In a fishing rod holder, a rod supporting saddle, a shaft mounted for sliding and rotating movements at one side of said saddle, a flat clamp arm on said shaft arranged to clamp a rod in said saddle, spring means for sliding and rotating said shaft toward unclamped position, and means for locking said shaft in clamped position.

5. In a fishing rod holder, a rod supporting saddle, a shaft mounted for sliding and rotating movements at one side of said saddle, a clamp arm on said shaft arranged to clamp a rod in said saddle, a torsion and compression spring on said shaft arranged to slide and rotate the shaft to unclamped position, and a latch bar fulcrumed at one side of said shaft for pivotal movement longitudinally of said shaft, said latch bar having a hole receiving said shaft and arranged to bind the shaft when the bar is inclined from a position perpendicular to the shaft.

6. In a fishing rod holder, a rod supporting saddle, a shaft at one side of said saddle, a clamp arm on said shaft arranged to clamp a rod in said saddle, said shaft and arm being movable between clamped and unclamped positions, means urging said shaft toward unclamped position, and a latch bar fulcrumed at one side of said shaft for pivotal movement longitudinally of said shaft, said latch bar having a hole receiving said shaft and arranged to bind the shaft when the bar in inclined from a position perpendicular to the shaft.

7. In a fishing rod holder, a rod supporting saddle, a vertical shaft at one side of said saddle, a horizontal clamp arm on said shaft arranged to clamp a rod in said saddle, a spring urging said shaft upward with a turning movement to a release position, a horizontal latch bar fulcrumed at one side of said shaft for vertical pivotal movement, said latch bar having a hole loosely receiving said shaft, and a spring urging said latch bar upward into binding engagement with said shaft.

8. In a fishing rod holder, a rod supporting saddle, a vertical shaft mounted for vertical and rotating movements at one side of said saddle, a horizontal clamp arm on said shaft arranged to clamp a rod in said saddle, spring means for producing vertical and rotating movements of said shaft toward unclamped position, and means for positively locking said shaft in any intermediate position ranging from minimum to maximum length of stroke of said shaft, said locking means comprising a latch bar having a depressing movement to instantly release said shaft.

9. In a fishing rod holder, a rod supporting saddle, a radial clamp arm mounted for axial and rotative movements relative to a vertical axis at one side of said saddle, said arm being rotatable to a position overlying a rod in said saddle and depressable to engage the rod for clamping a rod in said saddle, spring means arranged to elevate and rotate said arm from clamping position for releasing the rod, and positive means for locking said arm in all clamping positions within its range of vertical movement, said locking means being instantly releasable by slight movement in one direction.

References Cited in the file of this patent

UNITED STATES PATENTS

| | | |
|---|---|---|
| 2,502,272 | Patton | Mar. 28, 1950 |
| 2,576,212 | Carter | Nov. 27, 1951 |
| 2,599,160 | Brauer | June 3, 1952 |
| 2,851,234 | Scheifele | Sept. 9, 1958 |